Dec. 24, 1946.   V. F. ZDANCEWICZ   2,412,954
COATING DEVICE
Filed March 25, 1943   2 Sheets—Sheet 1

VINCENT F. ZDANCEWICZ INVENTOR.
BY Lawrence Burns,
ATTORNEY

Patented Dec. 24, 1946

2,412,954

UNITED STATES PATENT OFFICE 2,412,954

COATING DEVICE

Vincent F. Zdancewicz, Lynn, Mass.

Application March 25, 1943, Serial No. 480,565

2 Claims. (Cl. 91—43)

1

This invention relates to the manufacture of luminescent lamps and more particularly to apparatus for applying a coating of luminescent material thereto.

An object of this invention is to provide improved means for applying a coating of luminescent material to a lamp envelope in the manufacture of fluorescent lamps.

Another object is to provide means for coating lamp envelopes in a shorter time, at less cost, and with less waste.

Another object is to provide means for coating lamp envelopes from the top down without the introduction of air bubbles in the coating.

Another object is to provide an arrangement such that a low viscosity coating solution may be used in the manufacture of fluorescent lamps to provide quicker draining and drying action without detriment to the quality of the coating.

Further objects, advantages and features will be apparent from the following specification and accompanying drawings, in which.

Figure 1:
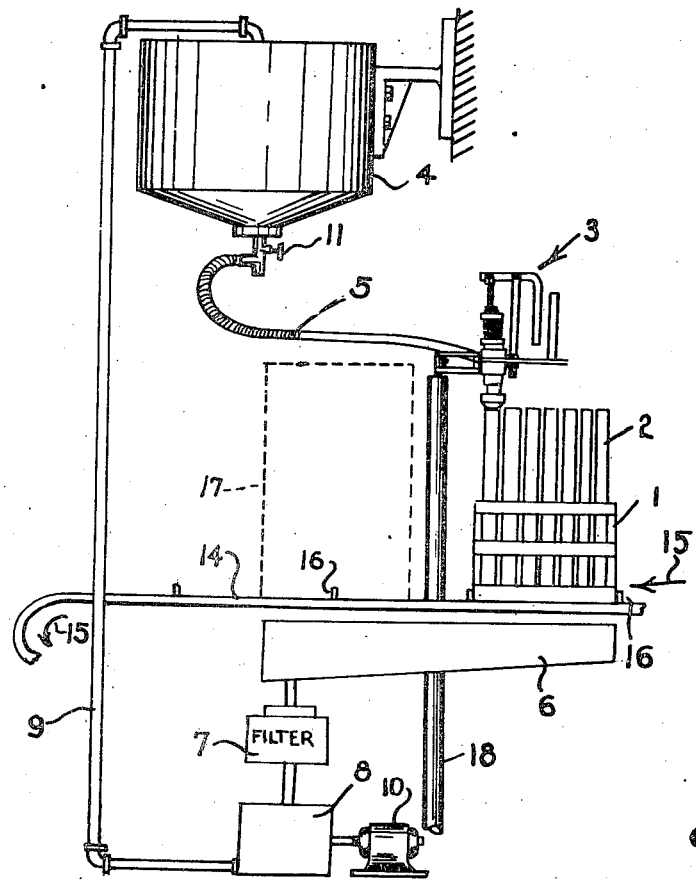
Figure 1 is an elevation of a structure embodying this invention.

As an illustration of this invention, the apparatus shown in the drawings and described herein is for use in the manufacture of elongated tubular fluorescent lamps and particularly for the accomplishment of the step of coating the inside wall of a glass envelope for such a lamp with a fluorescent material.

Using such apparatus, a quantity of fluorescent material in solution is injected into a vertically held tubular glass envelope. Draining and drying complete the coating step.

A particular advantage derived from the use of the apparatus of this invention is that a low viscosity solution may be used, thus expediting the draining and drying actions and cutting down the time and cost factors of the coating step.

The apparatus, as in Figure 1, comprises mainly of a mounting rack 1, in which tubular glass envelopes 2 are vertically held; a coating nozzle assembly 3; a coating solution supply tank 4 connected to nozzle assembly 3 through a flexible

2 hose 5; a solution salvage drain pan 6 mounted beneath the rack 1 and tubes 2; a filter unit 7 for receiving and cleaning the solution from pan 6; and a salvage tank 8. The solution is pumped to the supply tank 4 through the pipe 9 by the pump 10. The supply tank 4 has a nozzle shut off valve 11.

Figure 4:
Figure 4 is an illustration of the support arrangement of the tubular glass envelopes in the holding rack, as in Figure 1.
Figure 5:
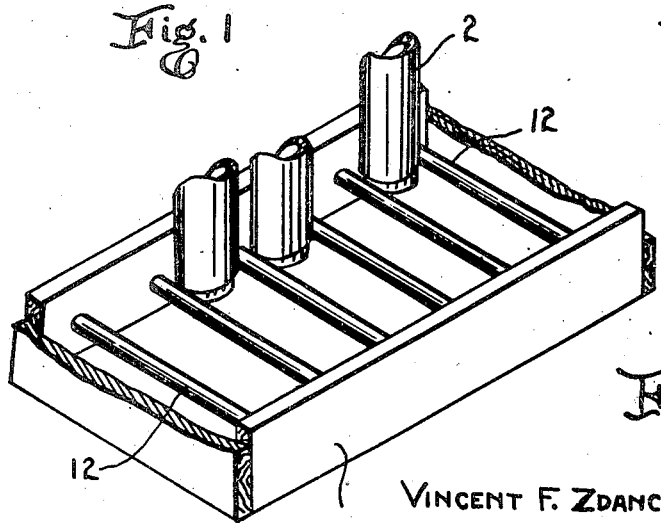
Figure 5 is a further illustration of the envelope support.

The mounting rack 1 is open at the bottom except for cross-bars 12, Figures 4 and 5. These figures illustrate the manner in which the glass tubes 2 are supported. Figure 4 shows the customary reduced end portions 13 of the tubes 2. The rounded shoulders provided by the reduced portions 13 rest on the cross bars 12 and the reduced portions 13 lie between the cross-bars 12 with the bottoms of the tubes 2 substantially flush with under sides of the cross-bars 12. Thus the solution, as it drains from the tubes 2, drops directly into the salvage pan 6, without splashing on the cross-bars 12 or adjacent tubes, and accordingly wastage is reduced.

The rack 1 is designed to hold a number of tubes 2 in a group beneath the movable nozzle assembly 3. The rack is placed on an endless belt 14, for movement in the direction of arrows 15. The rack 1 is engaged by belt fingers 16 and brought to a stop beneath the nozzle assembly 3 for a period sufficient to inject a quantity of coating solution in each tube. The belt 14 is then moved to locate the racked tubes in a drying or oven chamber outlined as at 17. Another rack of tubes is then coated and the first rack thereafter moved out of the chamber 17 and removed from the belt 14.

Figure 2:
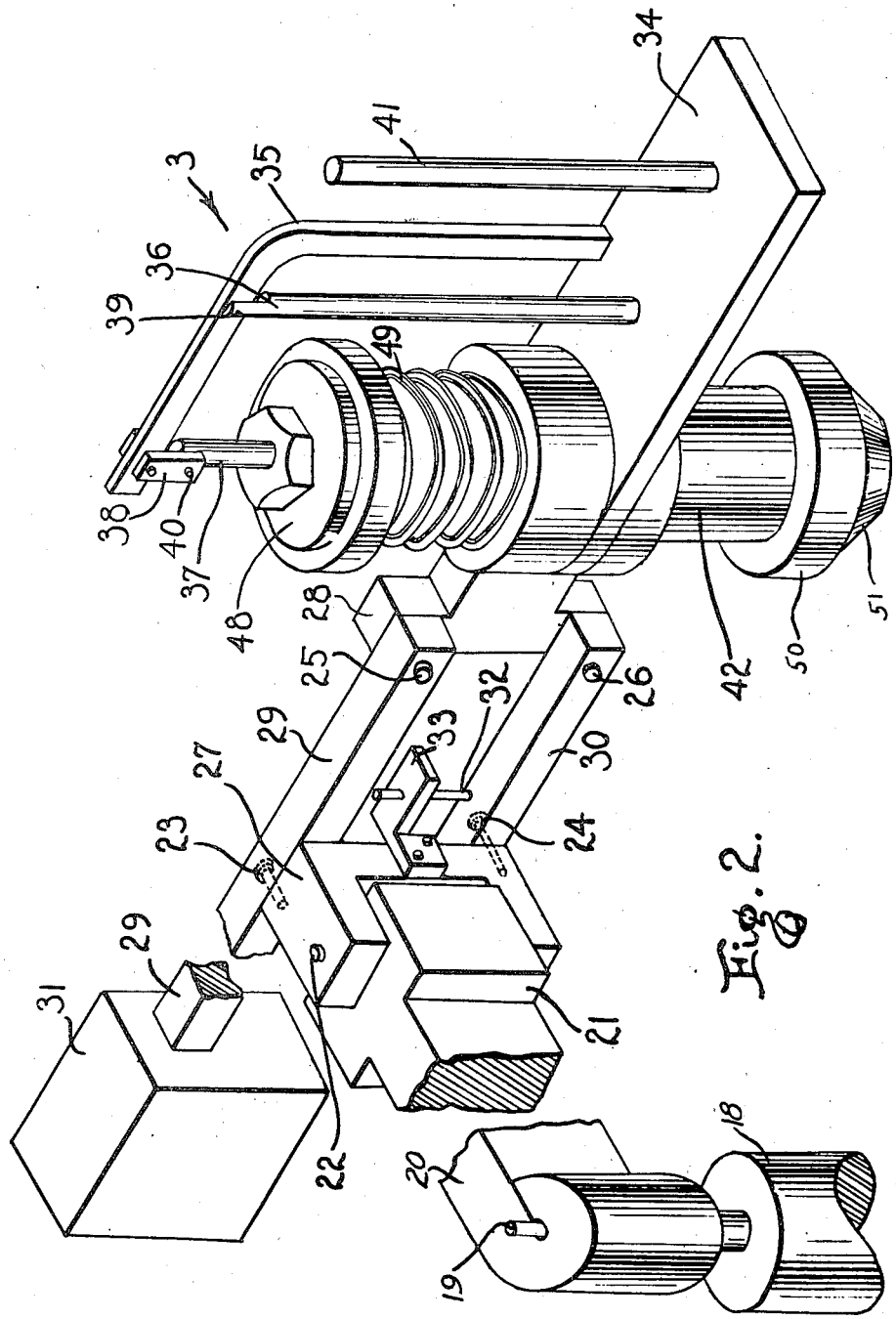
Figure 2 is an enlarged, isometric view of the nozzle assembly and mounting of the structure of Figure 1.

As in Figure 2, the coating nozzle assembly 3 is mounted for vertical and horizontal movement. This permits the nozzle to be moved down to and up from a tube to be coated, and from one tube to another in each racked group of tubes.

The support for the nozzle assembly comprises a fixed upright 18 having a vertical pivot rod 19 on the top thereof; a first link unit 20, pivoted about the rod 19; and a second link unit 21 pivoted to the first link unit 20, about a vertical pivot, as at 22. The pivots 19 and 22 thus provide for universal horizontal movement of the nozzle assembly 3.

Vertical movement of the nozzle assembly 3 is accomplished through the arrangement of the second link unit 21. This unit comprises a parallelogram construction with adjacent sides thereof pivoted to each other at the corners of the parallelogram as at 23, 24, 25, and 26. The ends of the parallelogram, the yoke 27 and bracket 28, are always vertical, and connected by side bars 29 and 30. The nozzle assembly 3 is fixed to the bracket 28 and normally held in raised position through the action of a counterbalance weight 31 on an extension of the arm 29 beyond the pivot 23. Thus a small manual force is all that is needed to move the nozzle assembly 3 down to the tube 2 to be coated. A stop bar 32 is threadedly mounted in a bracket 33 on the yoke 27 and in position between the arms 29 and 30 to adjustably limit the vertical movement of the nozzle assembly 3.

The gun-type nozzle operation arrangement is shown in Figure 2 supported on a shelf 34. This includes an angle piece trigger 35, pivotally mounted on an upright 36, and connected to the valve shaft 37 through link 38 which is pivoted to the trigger 35 as at 39, and to the shaft 37 as at 40. A fixed, vertical grip rod 41 is mounted on the shaft 34 so that rod 41 and trigger 35 may be manually gripped together to pull on trigger 35, thus pushing the valve shaft 37 down to open the nozzle valve and permit the discharge of a quantity of coating solution.

Figure 3:
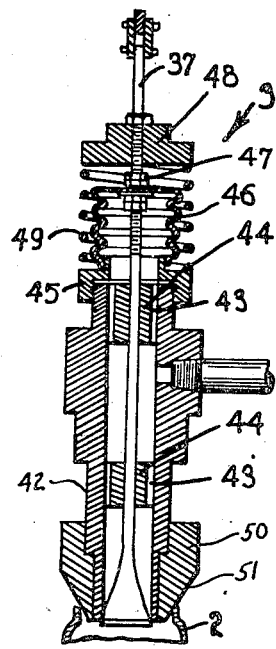
Figure 3 is a vertical, central section through the nozzle assemblies of Figures 1 and 2.

Details of the nozzle assembly 3 are shown in Figure 3. The housing 42 has a vertical cylindrical opening therethrough which contains the valve shaft 37 mounted in guide blocks 43 formed with vertical slots 44 to permit the passage of the coating solution through the housing opening about the shaft 37.

Housing 42 is capped with an annular ring nut 45 threaded over the top of the housing and having a bellows 46 sealed thereto to form a coating solution-tight chamber with the opening through the housing 42. Valve shaft 37 passes through the upper end of the bellows 46 and is adjustably fixed thereto by the nuts 47, so that the shaft 37 may move up and down in the housing 42 without leakage through the upper end of the chamber.

A cap member 48 is threaded on shaft 37 and a coil spring 49 is mounted between the nut 45 and the cap 48 and thus constantly urges shaft 37 upward to close the nozzle valve.

The coating solution enters the housing 42 from the supply hose 5 and exits past the lower flared end of the shaft 37 when it is pushed down, and flows into a tube 2 under the action of gravity only. No air or other applied pressure is used.

The lower end of the housing 42 provides a seat for the enlarged lower end of the shaft 37 and spring 49 normally holds the shaft against this seat to close the valve.

An annular sleeve 50 is mounted on the lower portion of housing 42 and is formed with an outer base-up conical surface 51 for guiding and centering the nozzle in the end opening of a lamp tube 2. This arrangement adapts the nozzle for use with glass tubes of different sizes.

A part of the inside of the tube 2 overlaps the end of the sleeve 50 and thus lies above the level at which the coating leaves the housing 42. This, plus the annular contact of the end of tube 2 with the surface 51, keeps the upper edge and an annular end area of the inner wall of the tube free from coating, and eliminates the step of cleaning this end after coating preparatory to sealing a base to the tube.

The lower end of shaft 37 is enlarged with a curved tapered surface to cause the coating solution to be discharged from the housing 42 in a smooth, even, annular flow, free from air or other pressure bubbles or impurities.

What I claim is:

1. An apparatus for applying fluorescent coating to the wall of open ended envelopes for gaseous discharge devices comprising a reservoir for fluorescent coating material the liquid level of which is maintained at a point above the point of application of the material to the envelopes, means for holding a plurality of envelopes in vertical position, a unitary nozzle member, means to conduct liquid from said reservoir to said nozzle, said nozzle being capable of stopping the flow of coating material under pressure, and having a vertically moveable gate member, a four bar linkage disposed with its pivot axes horizontal, means for securing one of its links to a fixed support and means for securing said nozzle with its gate member in vertical position to the opposite link of said linkage whereby the nozzle may be positioned successively over the ends of said envelopes and means for opening the gate of said nozzle to cause the coating material to flow onto the inner wall of the envelopes.

2. The combination of claim 1 in which the means for securing one of the links of the four bar linkage to a fixed support is a link unit with its pivot axes vertical.

VINCENT F. ZDANCEWICZ.